March 9, 1926. 1,576,419
W. ELLMAN
FOOD RECEPTACLE FOR YOUNG CHICKENS
Filed July 3, 1925 2 Sheets-Sheet 1
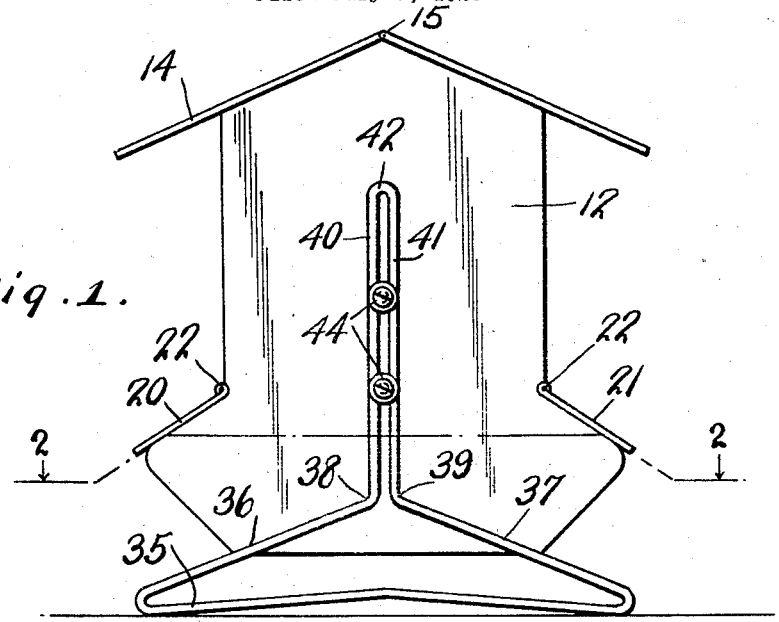
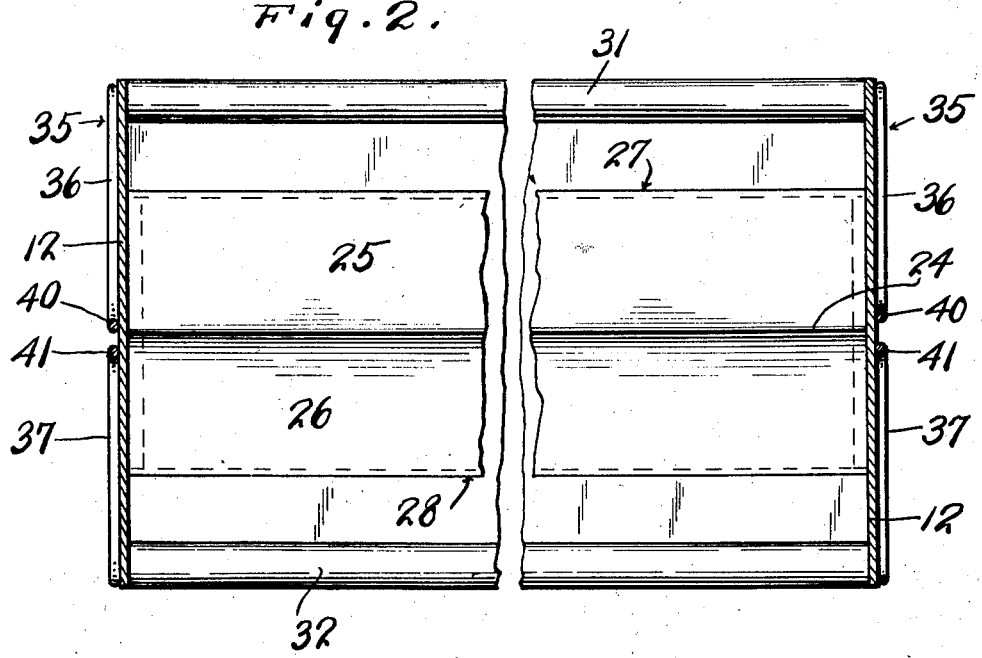
Walter Ellman
INVENTOR
BY *Victor J. Evans*
ATTORNEY
*R. B. James*
WITNESS:

March 9, 1926.  1,576,419
W. ELLMAN
FOOD RECEPTACLE FOR YOUNG CHICKENS
Filed July 3, 1925  2 Sheets-Sheet 2
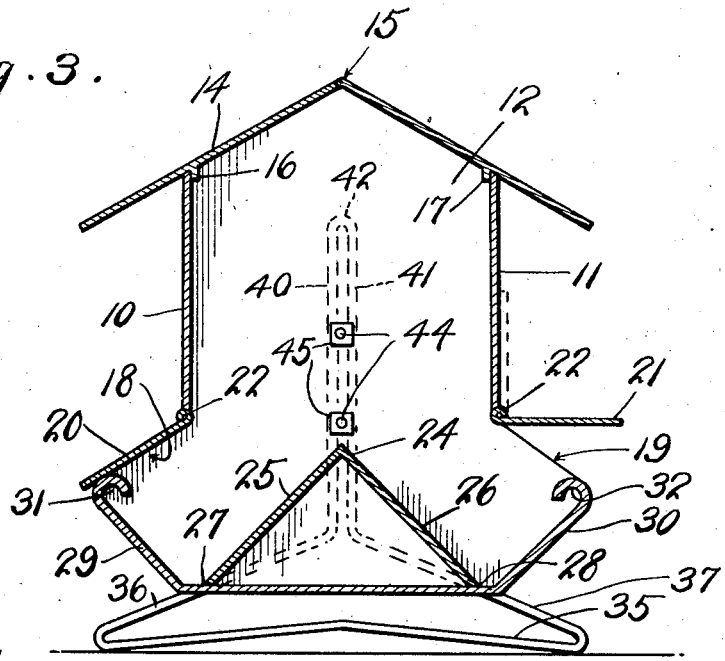
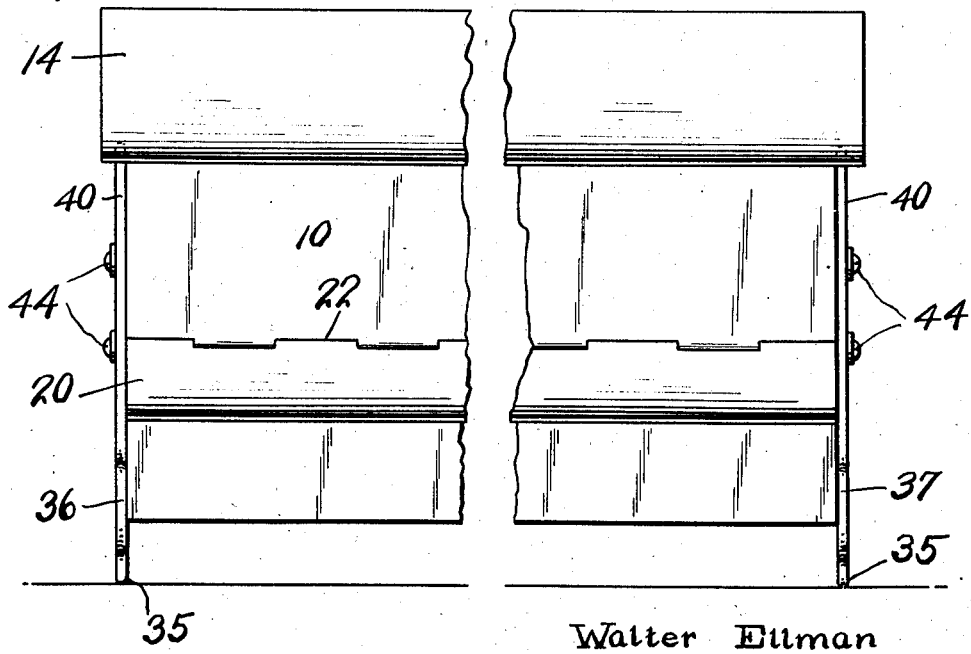
Walter Ellman
INVENTOR
BY Victor J. Evans
ATTORNEY
L. B. James.
WITNESS:

Patented Mar. 9, 1926.

1,576,419

UNITED STATES PATENT OFFICE.

WALTER ELLMAN, OF FREMONT CENTER, NEW YORK.

FOOD RECEPTACLE FOR YOUNG CHICKENS.

Application filed July 3, 1925. Serial No. 41,302.

*To all whom it may concern:*

Be it known that I, WALTER ELLMAN, a citizen of the United States, residing at Fremont Center, in the county of Sullivan and State of New York, have invented new and useful Improvements in Food Receptacles for Young Chickens, of which the following is a specification.

The object of this invention is to provide a food or feed receptacle or hopper especially adapted for the use of young chickens, and so constructed that the food may be kept clean and in good condition at all times, and readily accessible to the fowls.

A further object is to provide special means for adjusting the receptacle, so that it may be suitable for use as the young chicks grow older and larger and can reach the side openings of the receptacle when elevated several inches above the floor or above the ground.

A further object is to provide a receptacle or hopper in which the material will flow gradually, without clogging, toward the feed openings, as the material is consumed.

With the foregoing and other objects in view, the invention consists in the novel construction and arrangement of elements described, illustrated and claimed, it being understood that modifications may be made within the scope of the claims without departing from the spirit of the invention.

In the drawings forming part of this application:

Figure 1 shows the device in end elevation.

Figure 2 is a horizontal section on line 2—2 of Figure 1.

Figure 3 is a vertical transverse section.

Figure 4 is a view in side elevation, the middle portion of the structure being broken away.

The housing includes a structure in which the longer sides are designated 10 and 11, and the end portions are shown at 12. A cover 14 may comprise a plurality of pivotally connected sections as illustrated, a central pivot or hinge connection being shown at 15. On the under sides of the cover 14 are cleats 16 and 17 engaging the upper edge portions of the vertical walls 10 and 11, on the inner sides thereof. The lower edges of the verical sides 10 and 11 constitute the upper edges of the feed openings 18 and 19, these openings being closed respectively by covers 20 and 21 hinged at 22.

The lower portion of the housing may be of the form shown particularly in Figures 1 and 2, and it will be observed that there is a middle elevated portion or ridge 24 which is positioned intermediate of the vertical walls 10 and 11 of the housing, and that the bottom portion of the structure therefor includes downwardly and outwardly diverging portions 25 and 26. These portions last indicated, or the outer edges thereof, are deflected from the points 27 and 28 and extend thence upwardly as shown at 29 and 30. The upper edges of side portions 29 and 30 are inwardly and downwardly curved at 31 and 32, forming flanges which are engaged by covers 20 and 21 and which serve to prevent the feed from flowing over the edges, and also serve to protect the chickens from any sharp edge portions which might otherwise do injury.

An important feature of the construction is the means shown for supporting the housing, vertically adjustable end supports or legs being provided, as illustrated especially in Figure 1, and as shown in dotted lines in Figure 3.

The leg portions each include a lower structure which may be termed a base 35, preferably formed of heavy wire or the like, and including upwardly extending portions 36 and 37 which approach each other at the points 38 and 39, and extend thence upwardly as shown at 40 and 41, forming parallel elements of a U-member, the middle portion of which is designated 42. Between portions or elements 40 and 41 are screws or bolts, or any suitable securing devices. These devices are designated 44 and include heads and shank portions, the ends of the shanks being retained by the nuts 45 of Figure 3.

Vertical adjustment of the housing with reference to the surface of the floor or the surface of the ground may therefore be secured, in an obvious manner, the securing devices being merely loosened for obtaining the adjustment and then tightened. The use and operation of the device are otherwise apparent.

Having thus described the invention, what is claimed as new, is:—

1. The combination with a feed receptacle, of supporting devices therefor, said devices each including a lower element, portions extending from the ends of said element upwardly toward each other, devices extending alongside of each other from the points of nearest approach of said portions and adapted to support oppositely located walls of the receptable, and means adjustably connecting the devices last named with said walls.

2. A device of the class described comprising a housing forming a chamber for the reception of feed, and means for adjustably supporting said housing above the surface of the ground, said means including leg members each comprising a base portion and upwardly extending elements spaced to provide guiding members, and means passing between the guiding members and into the sides of the housing for adjustably connecting the leg members with said housing.

In testimony whereof I affix my signature.

WALTER ELLMAN.